US010893417B1

(12) United States Patent
Gandhi et al.

(10) Patent No.: US 10,893,417 B1
(45) Date of Patent: Jan. 12, 2021

(54) SOFT SERVICE MIGRATION BETWEEN SPECTRUM ACCESS SYSTEM (SAS) PROVIDERS FOR CITIZENS BROADBAND RADIO SERVICE (CBRS) NETWORKS

(71) Applicant: Cisco Technology, Inc., San Jose, CA (US)

(72) Inventors: Indermeet Singh Gandhi, Bangalore (IN); Mukesh Taneja, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/531,834

(22) Filed: Aug. 5, 2019

(51) Int. Cl.
*H04W 16/14* (2009.01)
*H04W 28/16* (2009.01)
*H04W 48/08* (2009.01)

(52) U.S. Cl.
CPC .......... *H04W 16/14* (2013.01); *H04W 28/16* (2013.01); *H04W 48/08* (2013.01)

(58) Field of Classification Search
CPC . H04W 16/14; H04W 24/02; H04W 36/0072; H04W 36/16; H04W 60/00; H04W 28/16; H04W 48/08; H04L 65/1016; H04L 41/50; H04L 65/1073; H04L 67/1014; H04L 67/148; G06F 9/4875
See application file for complete search history.

(56) References Cited

U.S. PATENT DOCUMENTS

| 8,824,436 | B2 | 9/2014 | Flore et al. | |
|---|---|---|---|---|
| 9,775,050 | B1* | 9/2017 | Wang | H04W 72/10 |
| 10,750,366 | B1* | 8/2020 | Gundavelli | H04L 9/0844 |
| 2011/0255550 | A1* | 10/2011 | Ye | H04L 65/1006 370/401 |
| 2016/0164722 | A1 | 6/2016 | Zhu et al. | |

(Continued)

FOREIGN PATENT DOCUMENTS

WO  WO-2017186294 A1 * 11/2017 ........ H04W 36/0072

OTHER PUBLICATIONS

Moorut, et al., "Spectrum Sharing Committee Work Group 3 (WGS) Protocol Workshop," https://www.wirelessinnovation.org, Apr. 2015, 68 pages.

(Continued)

*Primary Examiner* — Matthew C Sams
(74) *Attorney, Agent, or Firm* — Edell, Shapiro & Finnan, LLC

(57) ABSTRACT

Techniques and mechanisms for a soft migration from an initial or source Spectrum Access System (SAS) of a source SAS provider to a destination SAS of a destination SAS provider for a base station operative to serve as a Citizens Broadband Radio Service Device (CBSD) in a Citizens Broadband Radio Service (CBRS) network are described. While the base station operates to facilitate communications for one or more user equipments (UEs) and is registered with the source SAS for spectrum access, the base station may communicate in one or more message exchanges for registering with the destination SAS and for receiving from the destination SAS a grant for spectrum access to spectrum according to a plurality of operating parameters. After communicating in a message exchange with the destination SAS in a heartbeat procedure for receiving an authorization to use the granted spectrum, the base station may deregister with the source SAS.

20 Claims, 10 Drawing Sheets

(56) References Cited

U.S. PATENT DOCUMENTS

| | | | |
|---|---|---|---|
| 2016/0381558 A1 | 12/2016 | Caulfield | |
| 2017/0272962 A1 | 9/2017 | Lu et al. | |
| 2018/0115903 A1* | 4/2018 | Badic | H04W 72/042 |
| 2018/0288621 A1* | 10/2018 | Markwart | H04L 5/0035 |
| 2018/0341520 A1* | 11/2018 | Zhu | H04W 36/0033 |
| 2019/0115950 A1 | 4/2019 | Kakinada et al. | |
| 2019/0132776 A1* | 5/2019 | Markwart | H04W 36/16 |
| 2019/0223025 A1 | 7/2019 | Kakinada et al. | |
| 2019/0239157 A1 | 8/2019 | Wong et al. | |
| 2019/0364565 A1* | 11/2019 | Hmimy | H04W 24/02 |
| 2020/0260289 A1* | 8/2020 | MacMullan | H04W 88/12 |
| 2020/0260291 A1* | 8/2020 | Markwart | H04L 67/2809 |

OTHER PUBLICATIONS

Palola, et al., "Field Trial of the 3.5 GHz Citizens Broadband Radio Service Governed by a Spectrum Access System (SAS)," 2017 IEEE International Symposium on Dynamic Spectrum Access Networks (DySPAN), Mar. 2017, 9 pages.

Google, "Spectrum Sharing," https://www.google.com/get/spectrumdatabase/,Aug. 2019, 7 pages.

Dano, "Google Put a Price on CBRS SAS: $2.25/Month Per Home," Light Reading, https://www.lightreading.com/mobile/5g/google-puts-a-price-on-cbrs-sas, Mar. 2019, 2 pages.

Kinney, "Shared spectrum is about more than CBRS," RCR Wireless News, https://www.rcrwireless.com/20180817/network-infrastructure/cbrs-shared-spectrum, Aug. 2018, 5 pages.

Mueck et al., "Spectrum Sharing: Licensed Shared Access (LSA) and Spectrum Access System (SAS)," White Paper, Spectrum Sharing—LSA and SAS (Version v.1.0), Oct. 2015, 27 pages.

The Software Defined Radio Forum Inc., "Signaling Protocols and Procedures for Citizens Broadband Radio Service (CBRS): Spectrum Access System (SAS)—Citizens Broadband Radio Service Device (CBSD) Interface Technical Specification," Document WINNF-16-S-0016, Version V1.0.1, Dec. 2016, 62 pages.

The Software Defined Radio Forum Inc., "Signaling Protocols and Procedures for Citizens Broadband Radio Service (CBRS): Spectrum Access System (SAS)—SAS Interface Technical Specification," Document WINNF-TS-0096, Version 1.3.1, Jan. 2019, 44 pages.

* cited by examiner

SOFT SERVICE MIGRATION BETWEEN SPECTRUM ACCESS SYSTEM (SAS) PROVIDERS FOR CITIZENS BROADBAND RADIO SERVICE (CBRS) NETWORKS

TECHNICAL FIELD

The present disclosure relates generally to Spectrum Access Systems (SASs) for use with Citizens Broadband Radio Service (CBRS) networks, and more particularly to techniques and mechanisms for providing a migration between SAS providers for base stations of CBRS networks.

BACKGROUND

Spectrum sharing in a Citizens Broadband Radio Service (CBRS) network is facilitated by a Spectrum Access System (SAS). A SAS is configured to authorize and manage the use of spectrum to CBRS base stations (or access points or "APs") in different CBRS networks. These CBRS base stations may be referred to as Citizens Broadband Radio Service Devices (CBSDs). The SAS maintains database information for each base station in each CBRS network. The database information includes tier status, geographical location, and other parameters for each base station to ensure compliance with regulations with the Federal Communications Commission (FCC) and other regulatory bodies.

Although some aspects of CBRS spectrum allocation have been standardized to comply with FCC regulations, there are many nuances regarding how each solution will be designed for scalability, robustness, and performance. Each one of multiple different SAS providers may have its own pricing model and may offer differentiated features to attract enterprise and other customers. Given current standards and using traditional approaches, if a subscriber of a CBRS network wished to change SAS providers, migration would likely result in an undesirable disruption of services to connected clients in the CBRS network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

DESCRIPTION OF EXAMPLE EMBODIMENTS

Figure 1A:
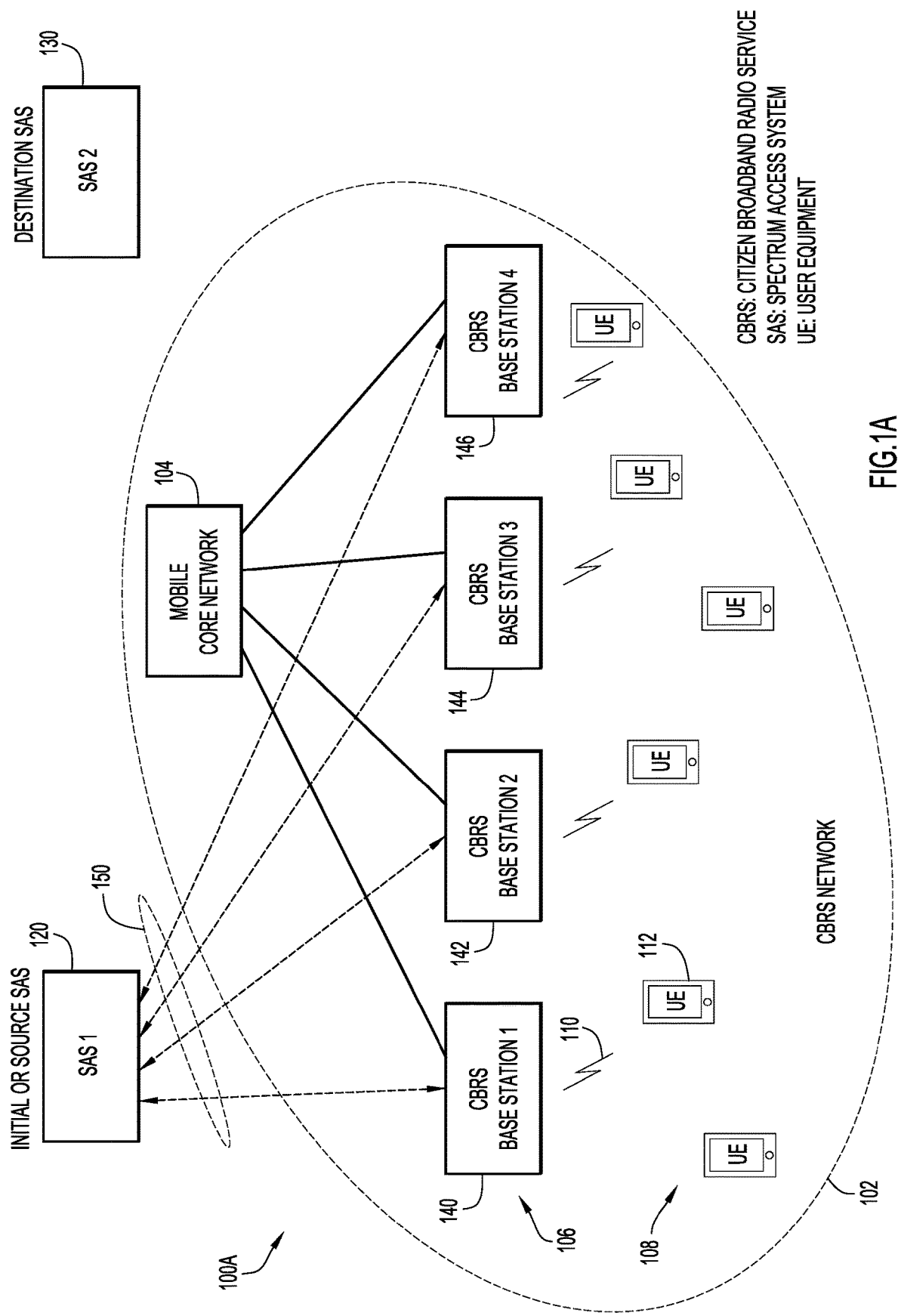
FIG. 1A is an illustrative representation of a system which includes a Citizens Broadband Radio Service (CBRS) network and an initial or source Spectrum Access System (SAS) of a source SAS provider, where base stations or Citizens Broadband Radio Service Devices (CBSDs) of the CBRS network are registered with the source SAS of the source SAS provider for spectrum access and operate to facilitate communications for one or more user equipments (UEs)

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques and mechanisms to facilitate a "soft" migration from a source Spectrum Access System (SAS) of a source SAS provider to a destination SAS of a destination SAS provider for a base station (or Access Point or "AP") operative to serve as a Citizens Broadband Radio Service Device (CBSD) in a Citizens Broadband Radio Service (CBRS) network are described herein.

In one illustrative example, the base station operative to serve as the CBSD or a domain proxy thereof may participate in a migration procedure according to some implementations of the present disclosure. While the base station operates to facilitate communications for one or more user equipments (UEs) and is registered with the source SAS of the source SAS provider for spectrum access, the base station or domain proxy thereof may communicate in one or more message exchanges for registering with the destination SAS of the destination SAS provider and for receiving from the destination SAS of the destination SAS provider a grant for spectrum access to spectrum according to a plurality of operating parameters. After communicating in a message exchange with the destination SAS of the destination SAS provider in a heartbeat procedure for receiving an authorization to use the granted spectrum, the base station or domain proxy thereof may deregister with the source SAS of the source SAS provider.

In another illustrative example, one or more servers of a SAS (i.e. the destination SAS of the destination SAS provider) may participate in a migration procedure according to some implementations of the present disclosure. While the base station operates to facilitate communications for one or more UEs and is registered with the source SAS of the source SAS provider for spectrum access, the server of the destination SAS of the destination SAS provider may communicate in one or more message exchanges for registering the base station with the destination SAS of the destination SAS provider and for granting spectrum access to spectrum according to a plurality of operating parameters. After the server of the destination SAS of the destination SAS provider communicates in a message exchange with the base station or domain proxy thereof in a heartbeat procedure to provide authorization to use the granted spectrum, the base station may deregister with the source SAS of the source SAS provider.

Advantageously, in at least some implementations, the migration procedure may be performed so as to provide little or no interruption to operation of the base station that facilitates the communications for the one or more UEs.

More detailed and alternative techniques and implementations are provided herein as described below.

Example Embodiments

As described above, spectrum sharing in a Citizens Broadband Radio Service (CBRS) network is facilitated by a Spectrum Access System (SAS). A SAS is configured to authorize and manage the use of spectrum to CBRS base stations (or Access Points of "APs," used interchangeably herein) in different CBRS networks. These base stations may be referred to as Citizens Broadband Radio Service Devices (CBSDs).

CBRS provides for use of a 150 MHz-wide broadcast band in the 3550-3700 MHz frequency range, i.e. Time Division (TD) Long-Term Evolution (LTE) (TD-LTE) band 48. There are three types of users allowed to access this spectrum, including incumbent users, Priority Access License (PAL) users, and General Authorized Access (GAA) users. The SAS serves to protect incumbents from interference from lower-tier PAL and GAA users, and protects PAL users from interference from other PAL and GAA users. The SAS maintains database information of spectrum usage by incumbent, PAL and GAA users in all census tracts (or areas), and allocates channels to CBSDs according to a variety of rules. For example, Tier 1 or incumbent users (such as navy ships, military radars and fixed satellite service earth stations) are allocated access to all the channels. Tier 2 or PAL users are granted access in the 3550-3650 MHz band and are allowed to use a maximum of seven (7) 10 MHz channels in a census tract (or area). Here, no licensee is allowed to take more than four (4) PAL channels in a census tract. Tier 3 or GAA users are allowed access to all the channels, but only channels that are not being used by the other above-indicated users.

Accordingly, a SAS makes determinations based on multiple factors and informs CBSDs of allowable operating parameters (e.g. frequency band or channel and maximum Effective Isotropic Radiated Power or "EIRP") that it can use at a given point of time, to ensure compliance with regulations with the Federal Communications Commission (FCC) and other regulatory bodies.

A CBRS network may receive spectrum access service from one of a plurality of different SASs provided by one of a plurality of different SAS providers. There are many nuances regarding how each SAS will be designed for scalability, robustness, and performance. Each one of the different SAS providers may have its own pricing model and may offer differentiated features to attract enterprise and other customers.

An enterprise may wish to select and/or change SAS providers for reasons such as pricing, performance, differentiated feature offerings, type of support offered by the SAS provider, and/or other strategic reasons. The enterprise may subscribe to an initial or source SAS provider (say, Provider "X") of a source SAS and then want to move to a different, destination SAS provider (say, Provider "Y") of a destination SAS.

Unfortunately, changing SAS providers may result in disruption of service for connected clients. For example, to change SAS providers, base stations of the enterprise may operate to deregister with Provider X, then register with Provider Y, followed by a performance of a series of related steps for grant and heartbeat procedures. The migration could result in the new Provider Y allocating new channels to the base stations. Accordingly, if a subscriber of a CBRS network wished to change SAS providers, the migration would likely result in an undesirable disruption of services.

It is desirable to make such a migration process seamless or as seamless as possible for enterprises and other customers. Accordingly, what are described herein are techniques and mechanism to best facilitate a seamless, zero downtime migration of base stations between SAS providers for CBRS networks. In one or more preferred implementations, migration of CBRS base stations or CBSDs between SAS providers may be made more simple and efficient, and with zero downtime. In one or more other preferred implementations, migration of CBRS base stations or CBSDs between SAS providers may be made with a reduced or minimized downtime and/or a reduced or minimized disruption of service.

In at least some implementations, the techniques and mechanisms to facilitate soft migration may leverage existing protocols and procedures in accordance with existing standards, with modification, adaptation, and/or additions provided according to the present disclosure. The existing standards are described in various known documents including "Signaling Protocols and Procedures for Citizens Broadband Radio Service (CBRS): Spectrum Access System (SAS)—Citizens Broadband Radio Service Device (CBSD) Interface Technical Specification," WInnForum Standards, Software Defined Radio Forum Inc., Spectrum Sharing Committee Work Group 3 (Protocols), SAS-CBSD TS, Document WINNF-16-S-0016-V1.0.1, December 2016. Thus, in some implementations, existing protocols and interfaces (e.g. SAS protocol and SAS interface) may be leveraged while achieving at least one or more of the advantages described herein.

To better explain in relation to the figures, FIG. 1A is a system 100A which includes a CBRS network 102 having a plurality of CBSDs or CBRS "base stations" 106 which interface for communications with a mobile core network 104. Mobile core network 104 may be an Enhanced Packet Core (EPC) which is part of the core network architecture of the Third Generation Partnership Project (3GPP)'s Long-Term Evolution (LTE) wireless communication standard. Mobile core network 104 may be provided by a mobile service provider. Base stations 106 (e.g. base stations 140, 142, 144, and 146) may operate to facilitate communications with a plurality of user equipments (UE) 108, such as base station 140 operating to facilitate a communication 110 with a UE 112. The communications may involve any type of UE or device, such as a smartphone, a laptop computer, a tablet device, or (e.g. even thousands of) Internet of Things (IoT) devices, etc.

In some implementations, CBRS network 102 may be or be part of an enterprise private network of a private enterprise. For CBRS spectrum access, CBRS network 102 may hold a subscription to a spectrum access service of a SAS ("SAS 1"), referred to as an initial or source SAS 120. Source SAS 120 may be made available through an initial or source SAS provider. Base stations 106 of CBRS network 102 may be registered with source SAS 120 of source SAS provider for this service. When provided with this server, base stations 106 may (e.g. periodically) communicate in a plurality of message exchanges with source SAS 120 for receiving grants for spectrum access to spectrum and for receiving authorizations to use granted spectrum. Such communication may take place over an existing interface such as a SAS-CBSD interface.

Accordingly in FIG. 1A, existing registrations of base stations 106 with source SAS 120 and/or authorizations to use spectrum are indicated by dashed lines between base stations 106 and source SAS 120, and further indicated in a grouping 150 of existing registrations and/or authorizations between base stations 106 and source SAS 120.

Figure 6:
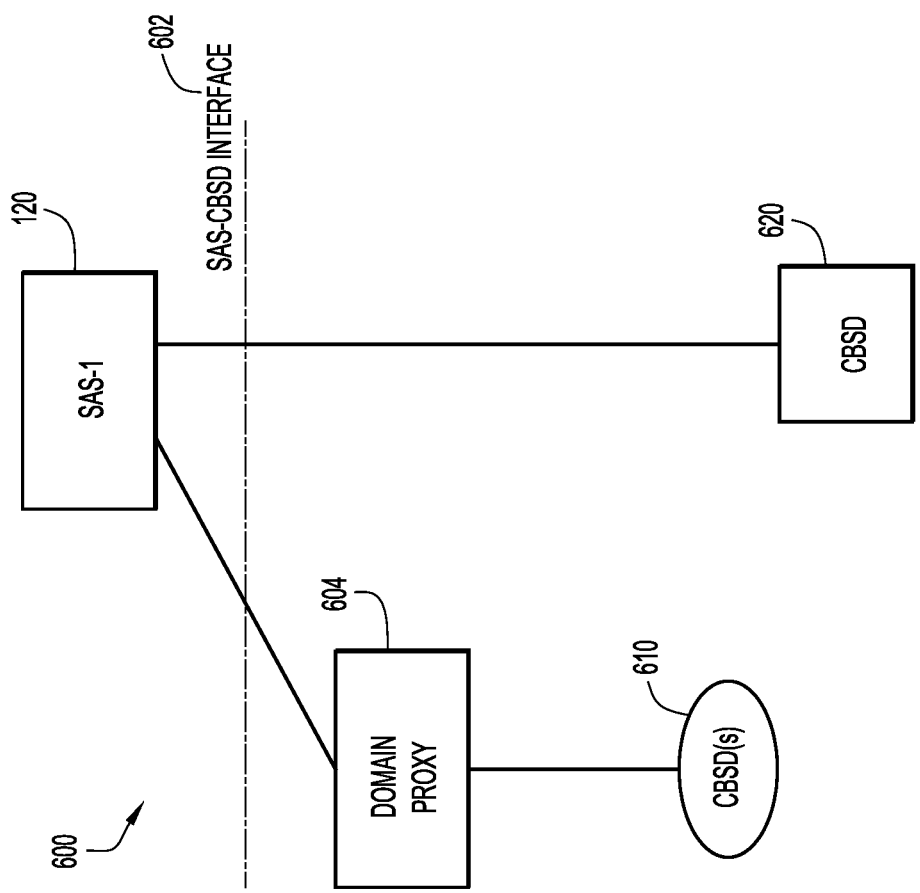
FIG. 6 is an illustrative representation of a network node arrangement which includes a SAS (e.g. the source SAS) which may communicate with a CBSD over a SAS-CBSD interface, or alternatively, the SAS which may communicate with one or more CBSDs via a domain proxy.

In some implementations, message exchanges between base stations 106 and SAS 120 may be performed directed between base stations 106 and SAS 120 over the SAS-CBSD interface. In other implementations, the message exchanges may be performed between a domain proxy of base stations 106 (e.g. base stations of the entire CBRS network 102) and SAS 120. Here, the domain proxy may perform and process the message exchanges on behalf of each one of base stations 106. With brief reference to FIG. 6, a network node arrangement 600 is shown which includes SAS 120 which may communicate with a CBSD 620 (e.g. a base station or AP) over a SAS-CBSD interface 602, or alternatively, SAS 120 which may communicate with one or more CBSDs 610 (e.g. multiple base stations or APs) via a domain proxy 604.

Referring back to FIG. 1A, at some point in time, CBRS network 102 or a subscriber thereof may receive an indication or instruction to change SAS providers. In particular, CBRS network 102 or subscriber thereof may receive an indication or instruction to change between source SAS 120 of the source SAS provider to a new, destination SAS 130 ("SAS 2") provided by a new, destination SAS provider. A need to change SAS providers may be based on considerations such as pricing, performance, differentiated feature offerings, type of support, and/or other reasons.

Figure 2:
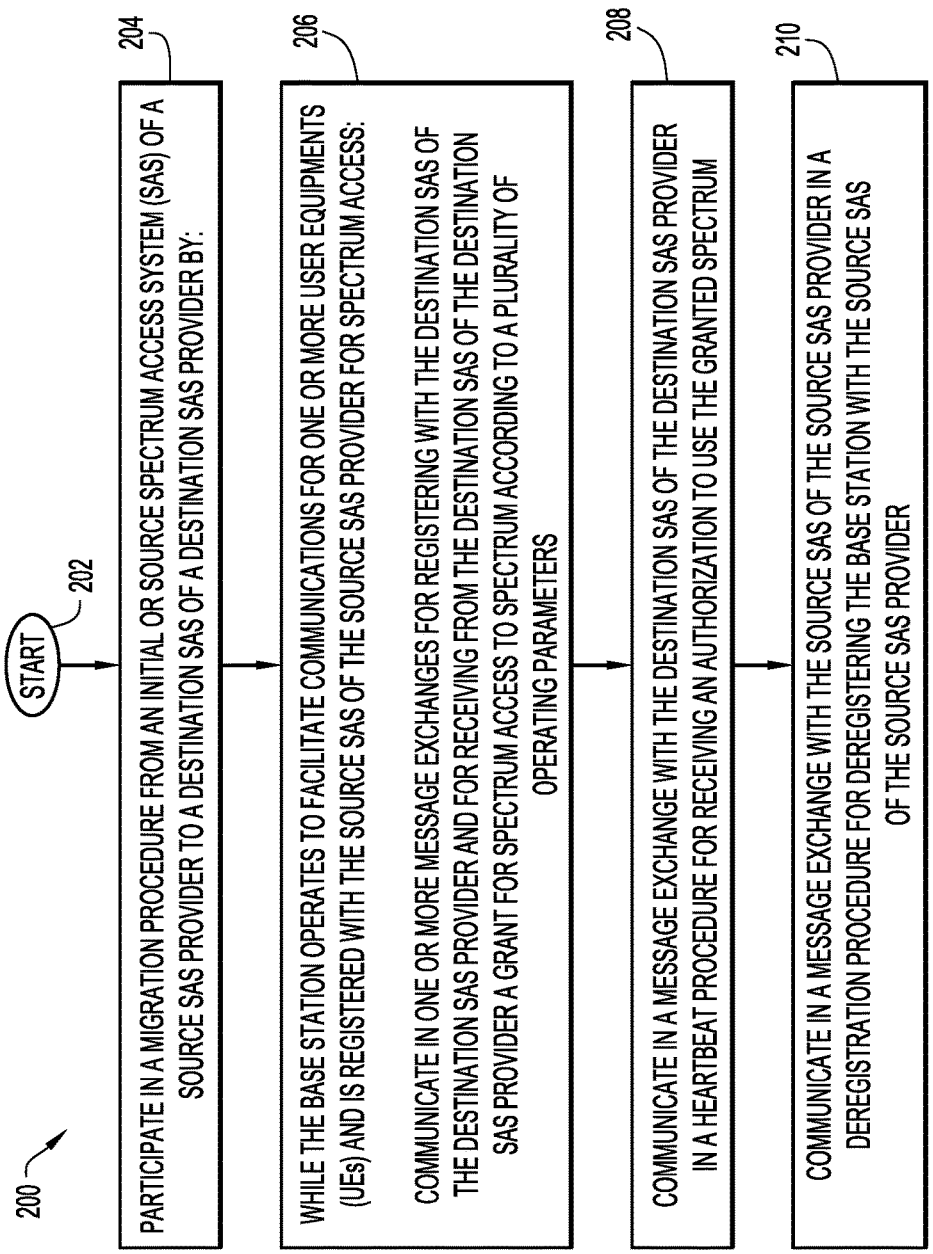
FIG. 2 is a flowchart for describing a method for migrating from an source SAS of an source SAS provider to a destination SAS of a destination SAS provider for a base station operative to serve as a CBSD in a CBRS network according to some implementations of the present disclosure, which may be performed by a base station or domain proxy thereof.

With reference now to FIG. 2, a flowchart 200 for describing a method for migrating from an initial or source SAS of a source SAS provider to a destination SAS of a destination SAS provider for a base station operative to serve as a CBSD in a CBRS network. Migration between SAS providers may be made with zero downtime, or alternatively a reduced or minimized downtime and/or a reduced or minimized disruption of service. The method may be performed by the base station operative to serve as the CBSD or a domain proxy (or other proxy or agent) of the base station. In some implementations, the domain proxy may perform the method for each one of a plurality of base stations of the CBRS network, during the same or similar timeframe. The method may be embodied as a computer program product including a non-transitory computer readable medium and instructions stored in the computer readable medium, where the instructions are executable on one or more processors of the base station for performing the steps of the method.

The method may begin where the base station is registered in an initial or source SAS of a source SAS provider (e.g. as illustrated generally in FIG. 1A). Beginning at a start block 202 of FIG. 2, the base station or domain proxy thereof may participate in a migration procedure from the initial or source SAS of the source SAS provider to a destination SAS of a destination SAS provider (step 204 of FIG. 2). The base station or domain proxy thereof may participate in the migration procedure by performing the following steps. While the base station operates to facilitate communications for one or more UEs and is registered with the source SAS of the source SAS provider for spectrum access, the base station or domain proxy thereof may communicate in one or more message exchanges for registering the base station with the destination SAS of the destination SAS provider, and for receiving from the destination SAS of the destination SAS provider a grant for spectrum access to spectrum according to a plurality of operating parameters (step 206 of FIG. 2). The base station or domain proxy thereof may then communicate in a message exchange with the destination SAS of the destination SAS provider in a heartbeat procedure for receiving an authorization to use the granted spectrum (step 208 of FIG. 2).

At this time, the base station may be registered with and/or authorized for granted spectrum from both source and destination SASs 120 and 130. This arrangement is illustrated generally at 100B in FIG. 1B, where new registrations of base stations 106 with destination SAS 130 and/or authorizations to use spectrum are indicated by dashed lines between base stations 106 and destination SAS 130, and further indicated in a grouping 160 of these registrations and/or authorizations between base stations 106 and destination SAS 130. At the same time, the previous existing registrations and/or authorizations indicated by grouping 150 may remain with source SAS 120.

With reference back to FIG. 2, the base station or domain proxy thereof may then communicate in a message exchange with the source SAS of the source SAS provider in a deregistration procedure for deregistering the base station with the source SAS of the source SAS provider (step 210 of FIG. 2). The base station may continue to operate to facilitate communications for the one or more UEs, now being registered with the destination SAS of the destination SAS provider for spectrum access. At this time, the base station may be registered with and/or authorized for granted spectrum only from destination SASs 130. This arrangement is illustrated generally at 100C in FIG. 1C, where the new registrations of base stations 106 with destination SAS 130 and/or authorizations to use spectrum remain (grouping 160), however the previous registrations and/or authorizations between base stations 106 and destination SAS 130 have been withdrawn.

Advantageously, the migration procedure may be performed to provide little or no interruption to operation of a base station in its facilitating of communications for the one or more UEs. In some implementations, the method of the base station or domain proxy thereof in FIG. 2 may be performed with at least some of the additional details provided in relation to call flows 400 and 500 of FIGS. 4 and 5, respectively.

Figure 3:
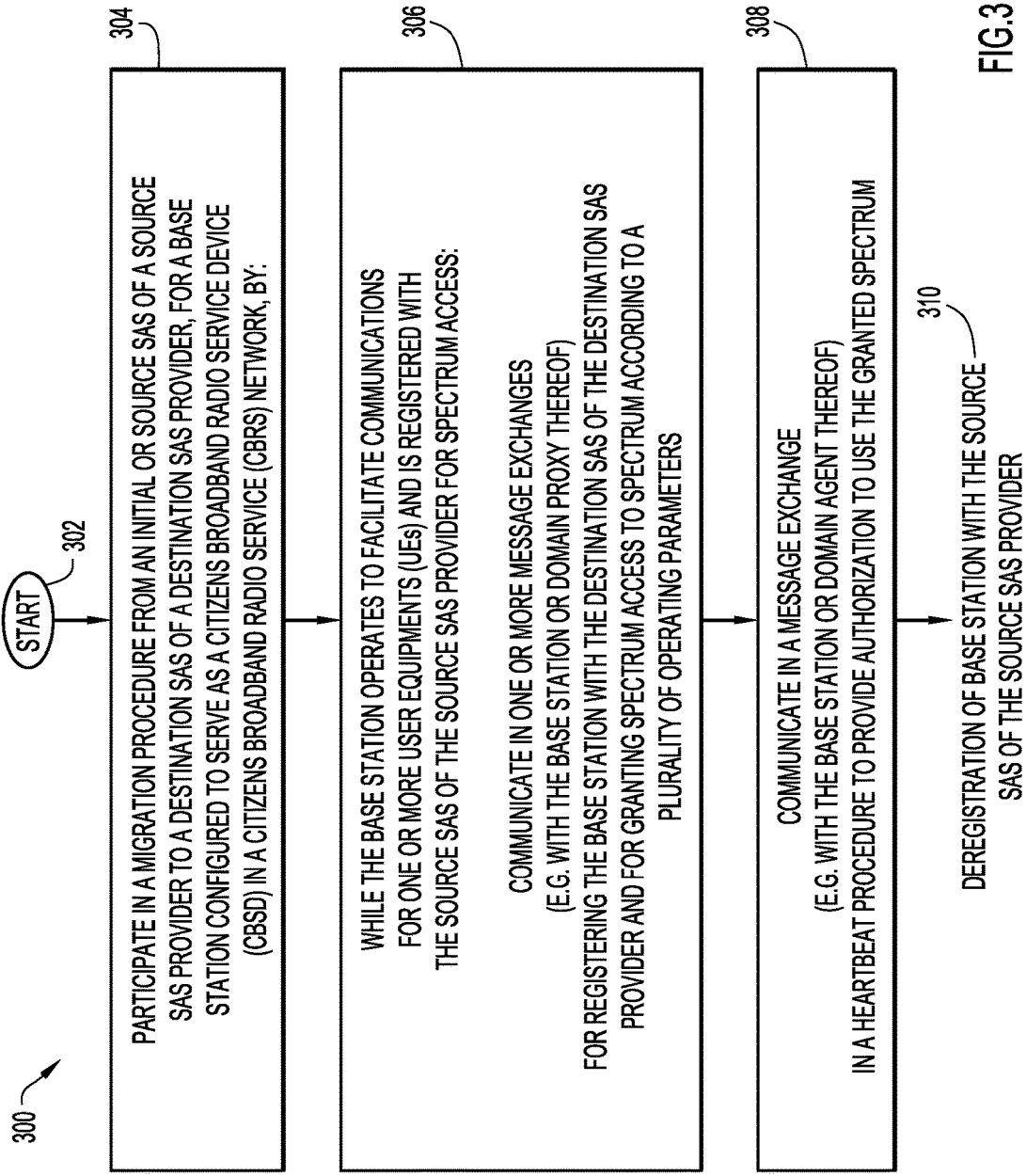
FIG. 3 is a flowchart for describing a method for migrating from a source SAS of a source SAS provider to a destination SAS of a destination SAS provider for a base station operative to serve as a CBSD in a CBRS network according to some implementations of the present disclosure, which may be performed by one or more servers of a destination SAS of a destination SAS provider.

FIG. 3 is a flowchart 300 for describing a method for migrating from an initial or source SAS of a source SAS provider to a destination SAS of a destination SAS provider for a base station operative to serve as a CBSD in a CBRS network. Migration between SAS providers may be made with zero downtime, or alternatively a reduced or minimized downtime and/or a reduced or minimized disruption of service. The method may be performed by one or more servers of a destination SAS of a destination SAS provider. Such a server may include one or more processors, memory, and a network interface to connect with a network. The method may be embodied as a computer program product including a non-transitory computer readable medium and instructions stored in the computer readable medium, where the instructions are executable on one or more processors of the server for performing the steps of the method.

The method may begin where the base station is registered in an initial or source SAS of a source SAS provider (e.g. again as illustrated generally in FIG. 1A). Beginning at a start block 302 of FIG. 3, a server of the destination SAS of the destination SAS provider may participate in a migration procedure for the base station from an initial or source SAS of a source SAS provider to the destination SAS of the destination SAS provider (step 304 of FIG. 3). The server of the destination SAS of the destination SAS provider may perform the migration procedure by performing the following steps. While the base station operates to facilitate communications for one or more UEs and is registered with the source SAS of the source SAS provider for spectrum access, the server may communicate in one or more message exchanges for registering the base station with the destination SAS of the destination SAS provider, and for granting spectrum access to spectrum according to a plurality of operating parameters (step 306 of FIG. 3). The server may communicate in a message exchange with the base station or domain proxy thereof in a heartbeat procedure to provide authorization to use the granted spectrum (step 308 of FIG. 3).

Figure 1B:
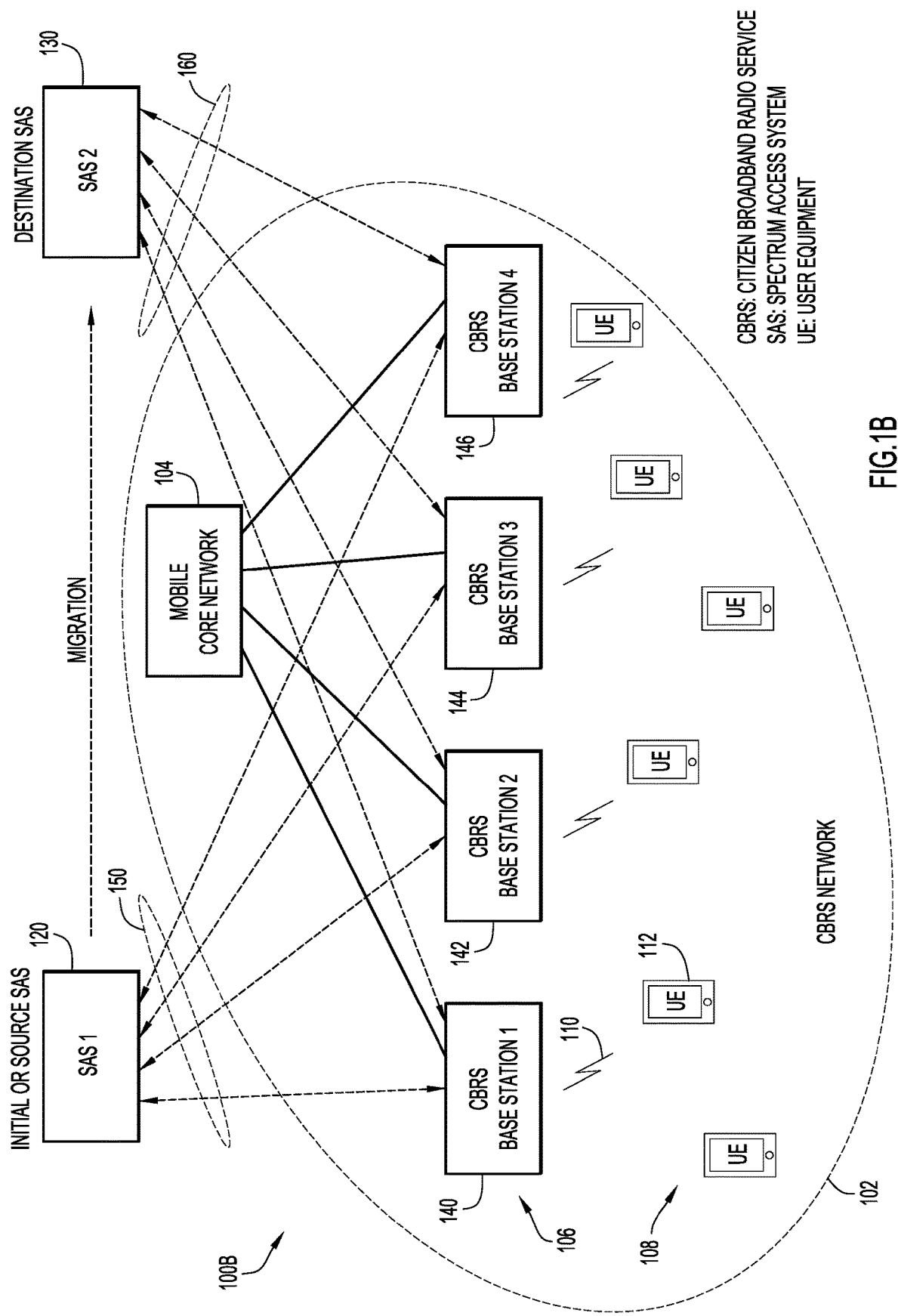
FIG. 1B is an illustrative representation of the system of FIG. 1A, but where a migration procedure is performed from the source SAS of the source SAS provider to a destination SAS of a destination SAS provider for the base stations of the CBRS network, which may occur while the base stations are registered with the source SAS of the source SAS provider for spectrum access and continue to operate to facilitate communications for the one or more UEs according to some implementations of the present disclosure.

At this time, the base station may be registered with and/or authorized for granted spectrum from both source and destination SASs 120 and 130 (e.g. again as illustrated generally in FIG. 1B). In FIG. 1B, new registrations of base stations 106 with destination SAS 130 and/or authorizations to use spectrum are indicated by dashed lines between base stations 106 and destination SAS 130, and further indicated in grouping 160 of these registrations and/or authorizations between base stations 106 and destination SAS 130. At the same time, the previous existing registrations and/or authorizations indicated by grouping 150 remain with source SAS 120.

Figure 1C:
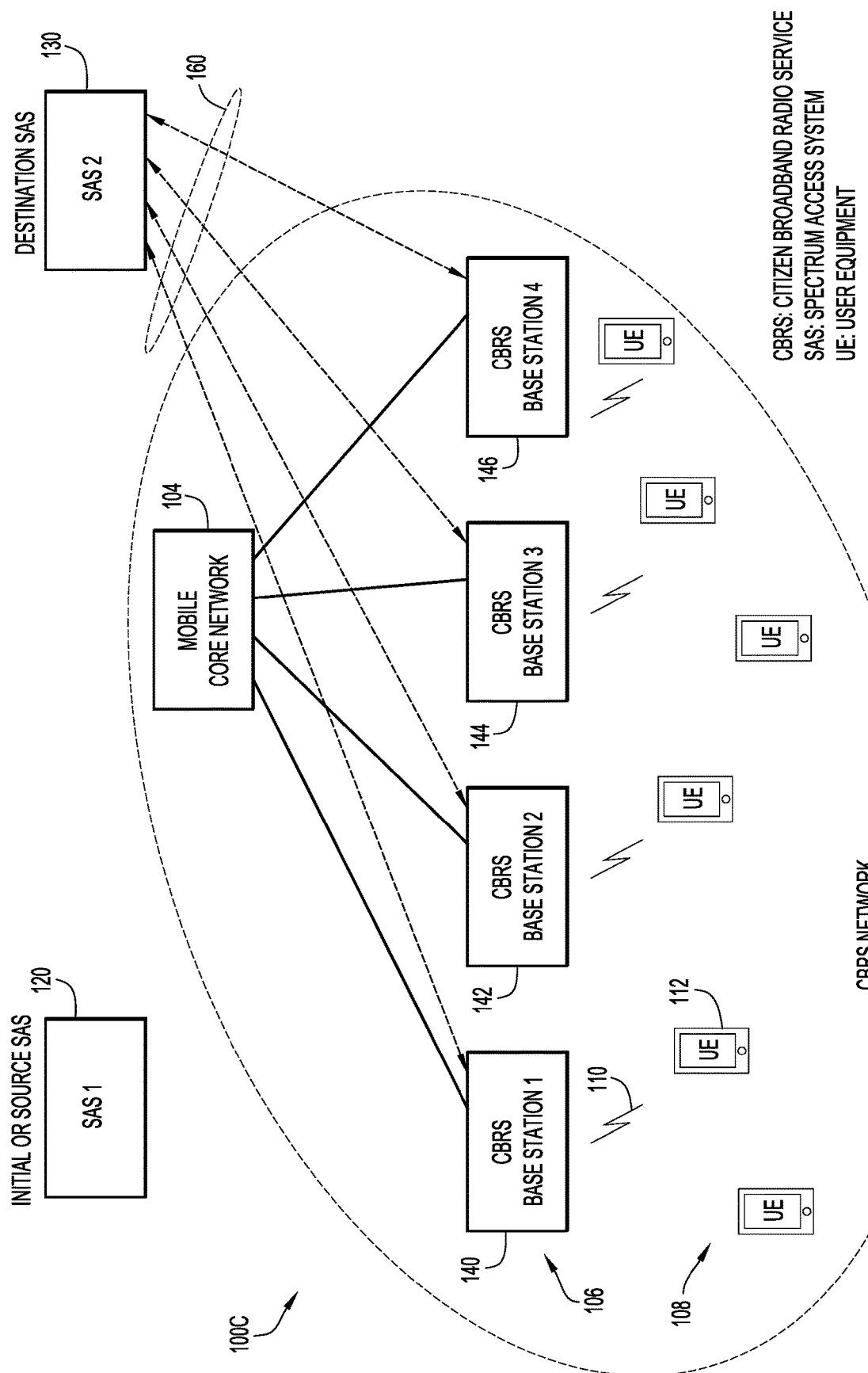
FIG. 1C is an illustrative representation of the system of FIG. 1B, but where the base stations of the CBRS network are registered with the destination SAS of the destination SAS provider for spectrum access and deregistered from the source SAS of the source SAS provider according to some implementations of the present disclosure.

With reference back to FIG. 3, subsequently, the base station may deregister with the source SAS of the source SAS provider (indication 310 of FIG. 3). At this time, the base station may be registered with and/or authorized for granted spectrum only from destination SASs 130 (e.g. again as illustrated generally in FIG. 1C). In FIG. 1C, the new registrations of base stations 106 with destination SAS 130 and/or authorizations to use spectrum remain (grouping 160), however the previous registrations and/or authorizations between base stations 106 and destination SAS 130 have been removed.

Advantageously, the migration procedure may be performed to provide little or no interruption to operation of a base station in its facilitating of communications for the one or more UEs. In some implementations, the method of the one or more servers of the destination SAS of the destination SAS provider in FIG. 3 may be performed with at least some of the additional details provided in relation to the call flows 400 and 500 of FIGS. 4 and 5, respectively.

Figure 4:
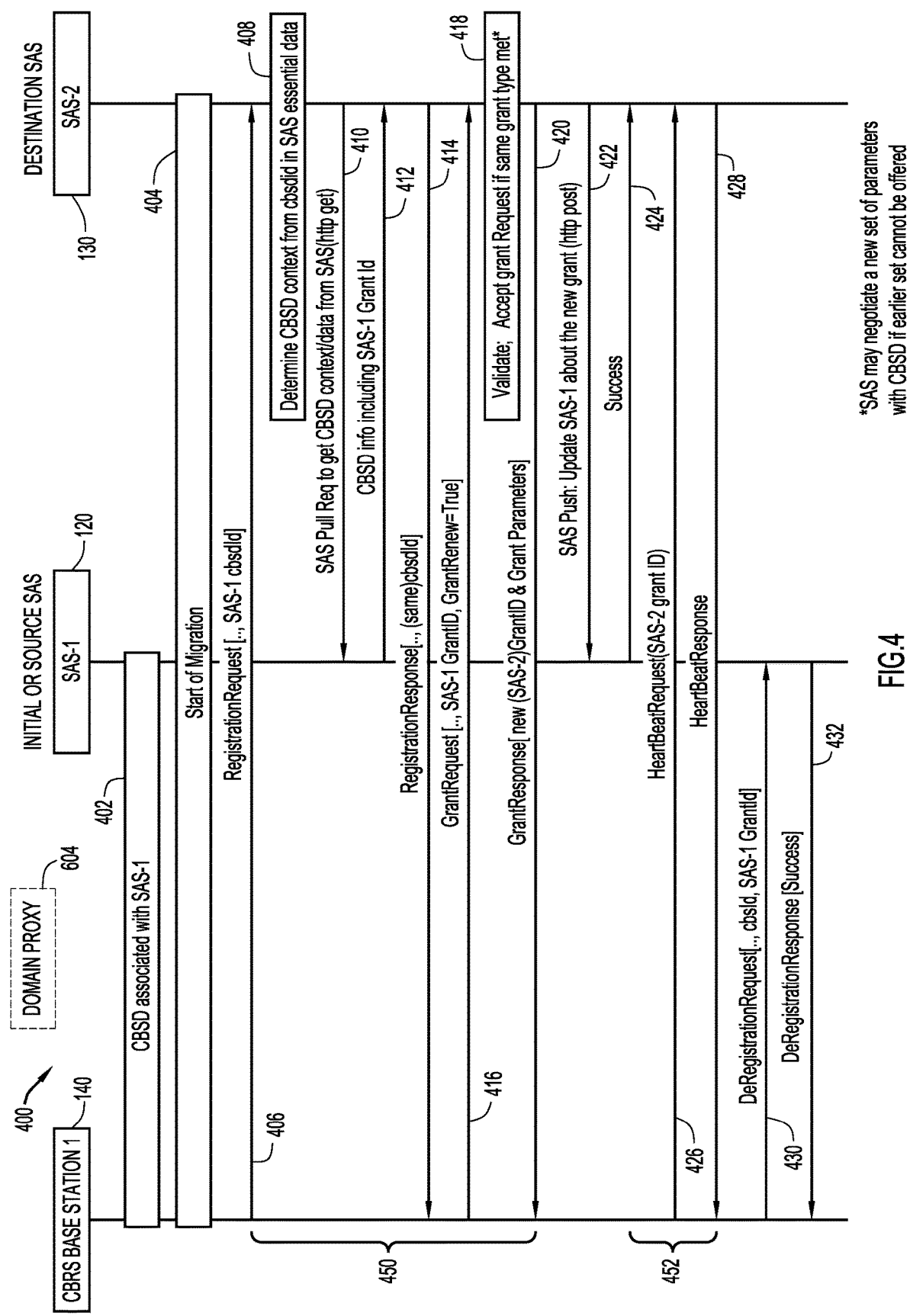
FIG. 4 is a call flow diagram for describing a more detailed method for migrating from a source SAS of a source SAS provider to a destination SAS of a destination SAS provider for a base station operative to serve as a CBSD in a CBRS network, according to a first detailed process of the present disclosure.

FIG. 4 is a call flow diagram 400 for describing a more detailed method for migrating from source SAS 120 ("SAS 1") of the source SAS provider to destination SAS 130 ("SAS 2") of the destination SAS provider, for base station 140 operative to serve as a CBSD in the CBRS network, according to a first detailed process of the present disclosure. Although references to communication (e.g. sending and/or receiving messages) with base station 140 may be made, it is understood that these communications may be made with domain proxy 604 (or other proxy or agent) as an alternative (see e.g. FIG. 6). In some implementations, the domain proxy may perform the method for each one of a plurality of base stations of the CBRS network, during the same or similar timeframe.

In at least some of the implementations of the present disclosure, at least many or most messaging protocols and formats of existing standards may be leveraged and remain unchanged. For example, existing peer SAS interface and protocols may be leveraged, including SAS message exchanges (using HTTP POST and GET methods) for minimum CBSD object data with a peer SAS at intervals; identifying CBSD ID, SAS instance, and SAS administrator through HTTP POST messages (e.g. Push with Data); and/or mutual authentication (i.e. Transport Layer Security or "TLS" v1.2). More specifically regarding SAS message exchanges, HTTPS (i.e. HTTP plus TLS) may be used as the transport protocol and HTTP GET and POST methods may be used for all SAS-SAS requests. Two exchange types, "push" and "pull," may be used for SAS to SAS information exchange. The "Push" and "Pull" methods may directly map to "POST" and "GET" methods, respectively, as defined by the HTTP protocol. "Push" may be used by one SAS to push information to be shared to one or more peer SASs, whereas "Pull" may be used by one SAS to pull desired information from a peer SAS.

In FIG. 4, the CBSD or base station 140 is initially associated with source SAS 120 (step 402 of FIG. 4). In particular, base station 140 is registered with source SAS 120 for spectrum access, and operates to facilitate communications for one or more UEs using an assigned channel (identified by a "channel ID").

For initial registration with source SAS 120, base station 140 may send to source SAS 120 a message indicating a registration request which includes data such as an FCC ID, a serial number of base station 140, and other parameters. In response, source SAS 120 may register base station 140 and generate a (unique) CBSD ID for base station 140 based on the FCC ID and other information, such as SHA-1 (e.g. the serial number). Source SAS 120 may then send to base station 140 a message indicating a registration response which includes data such as the CBSD ID assigned by source SAS 120. While registered with source SAS 120, base station 140 may operate to communicate with source SAS 120 in a plurality of (regular or periodic) message exchanges for receiving grants for spectrum access (via grant procedures) and for receiving authorizations to use granted spectrum (via heartbeat procedures). Base station 140 may be granted spectrum access according to a plurality of operating parameters, and this grant may be identified with a grant ID received from source SAS 120.

At some point in time, an indication or instruction to change SAS providers may be received, to start a migration procedure between source SAS 120 of the source SAS provider to destination SAS 130 ("SAS 2") of the destination SAS provider (step 404 of FIG. 4). The indication or instruction, including identification of destination SAS 130, may be provided via an Operations Administration and Maintenance (OAM) or other configuration of the enterprise. As stated previously, the need to change SAS providers may be based on considerations such as pricing, performance, differentiated feature offerings, type of support, and/or other reasons.

In preferred implementations, instead of deregistering with source SAS 120 and then registering with destination SAS 130, the migration procedure may involve techniques to achieve a "soft" migration. Here, while base station 140 is registered with source SAS 120 of the source SAS provider for spectrum access and operates to facilitate communications for one or more UEs, base station 140 may communicate in a plurality of message exchanges 450 for registering with destination SAS 130, and for receiving from destination SAS 130 a grant for spectrum access. In addition, base station 140 may then communicate in a message exchange 452 with destination SAS 130 in a heartbeat procedure for receiving an authorization to use the granted spectrum. Note that these message exchanges 450 and 452 also correspond to message exchanges performed by the server of destination SAS 130 for registering base station 140 and granting spectrum access to spectrum. Message exchanges 450 and 452 will now be discussed.

With more detail, base station 140 may send to destination SAS 130 a message indicating registration request for a registration procedure to register with destination SAS 130 (step 406 of FIG. 4). The registration request may include one or more registration request parameters, including the CBSD ID assigned by source SAS 120. In some implementations, the message may be sent to destination SAS 130 via source SAS 120. In some implementations, the message indicating the registration request may have the same or similar format as a registration request per existing standards. Alternatively, the message indicating the registration request may be a newly-defined registration request (e.g. a re-registration request) having a format with a limited number of fields (e.g. only the CBSD ID field).

Destination SAS 130 may receive the message indicating the registration request. In response, destination SAS 130 may determine or obtain CBSD context data of base station 140, as well as other CBSD data such as SAS administrator and SAS instance, based on the CBSD ID (step 408 of FIG. 4). Destination SAS 130 may determine or obtain the CBSD data in SAS-Essential Data, which are data shared between any two SASs to fulfill SAS functions (e.g. as required by 47 C.F.R Part 96). Note, however, that the content of the CBSD data received by destination SAS 130 in step 408 may be limited and not up-to-date, as it may be from a past peer SAS exchange. Destination SAS 130 may therefore issue a pull-type request to source SAS 120 (step 410 of FIG. 4) to fetch real-time information which includes the current grant ID and a grant type for base station 140 (step 412 of FIG. 4). As a response to the registration request of step 406, destination SAS 130 may send to base station 140 a message indicating a registration response, assigning it and including the same CBSD ID (step 414 of FIG. 4). Now, base station 140 is registered to both source SAS 120 of the source SAS provider and destination SAS 130 of the destination SAS provider.

Base station 140 may then send to destination SAS 130 a message indicating a grant request for a grant procedure with destination SAS 130 (step 416 of FIG. 4). The grant request may include the grant ID of the grant of spectrum access obtained earlier from source SAS 120. The grant request may further include or be associated with a plurality or a set of operating parameters (e.g. the channel ID and a maximum EIRP). In some implementations, these operating parameters may be the same operating parameters as those previously granted by source SAS 120.

In some implementations, the message indicating the grant request of step 416 of FIG. 4 may have the same or similar format as a grant request per existing standards. Alternatively, the message indicating the grant request may be a newly-defined grant request (e.g. a re-grant request) having a format with a limited number of fields (e.g. only the grant ID field). For example, with a newly-defined grant request having only the grant ID field, destination SAS 130 may obtain from source SAS 120 the plurality of operating parameters based on the grant ID.

Destination SAS 130 may receive the message indicating the grant request for the grant procedure in step 416. In response, destination SAS 130 may perform a channel access assessment to validate the operating parameters, identifying whether it is able to accommodate the same set of operating parameters as this existing set of operating parameters (step 418 of FIG. 4). Destination SAS 130 may accept the grant request and grant spectrum access according to the operating parameters if the same grant type is met. If so, destination SAS 130 may send to base station 140 a message indicating a grant response which includes a new grant ID for the grant and the plurality of operating parameters associated therewith (step 420 of FIG. 4).

In some implementations, if destination SAS 130 is unable to assign or grant the same set of operating parameters in step 418, destination SAS 130 may provide a new set of parameters to base station 140 (e.g. via source SAS 120) and wait for a response before confirming the grant. This wait time (e.g. in the form or a wait timer or corresponding indicator) may be provided to base station 140 to allow base station 140 to identify or prepare a new set of operating parameters.

Destination SAS 130 may then provide to source SAS 120 an indication of the successful migration of base station 140 together with the grant ID associated with source SAS 120 (step 422 of FIG. 4). This may be achieved through use of a Push Request (HTTP POST). In response, source SAS 120 may provide to destination SAS 130 an indication of acknowledgement or confirmation (e.g. of success of the migration) (step 424 of FIG. 4).

Base station 140 may then send to destination SAS 130 a message indicating a heartbeat request for a heartbeat procedure with destination SAS 130 (step 426 of FIG. 4). The heartbeat request may include the new grant ID of the grant of spectrum access obtained from destination SAS 130. Destination SAS 130 may receive the message indicating the heartbeat request. In response, destination SAS 130 may process the heartbeat request and send to base station 140 a message indicating a heartbeat response (step 428 of FIG. 4). Base station 140 may receive the message indicating the heartbeat response. This heartbeat response indicates that base station 140 is authorized to use the granted spectrum, and may further trigger base station 140 to deregister from source SAS 120.

Accordingly, base station 140 may send to source SAS 120 a message indicating a deregistration request for a deregistration procedure (step 430 of FIG. 4). The deregistration request may include the CBSD ID and the grant ID assigned by source SAS 120. Source SAS 120 may receive the message indicating the deregistration request and, in response, source SAS 120 may deregister base station 140 and send to base station 140 a message indicating a deregistration response (step 432 of FIG. 4). Base station 140 is now registered with destination SAS 130 of the destination SAS provider and deregistered from source SAS 120 of the source SAS provider.

In some scenarios, all CBSDs or base stations of a CBRS network may be migrated from a source SAS of a source SAS provider to a destination SAS of a destination SAS provider, as described in relation to FIG. 4 (whether performed individually or in a group via a domain proxy). In other scenarios, only some of the CBSDs or base stations of the CBRS network may be migrated from the source SAS to the destination SAS, thereby leaving some of the CBSDs or base stations registered with the source SAS while some of the CBSDs or base stations are registered with the destination SAS.

In some implementations, the latter scenario may be permitted when a grouping of base stations for a CBRS network is attempted for migration (e.g. by the domain proxy) but the destination SAS is unable to assign or grant the same set of operating parameters for all of the base stations but only rather some of the base stations. Here, a wait timer may be set and run, at each base station or the domain proxy, in order to allow each base station or the domain proxy to re-request or re-invoke migration to the destination SAS. In some implementations, the wait timer may be exchanged or sent from the destination SAS to the base station or domain proxy.

Figure 5:
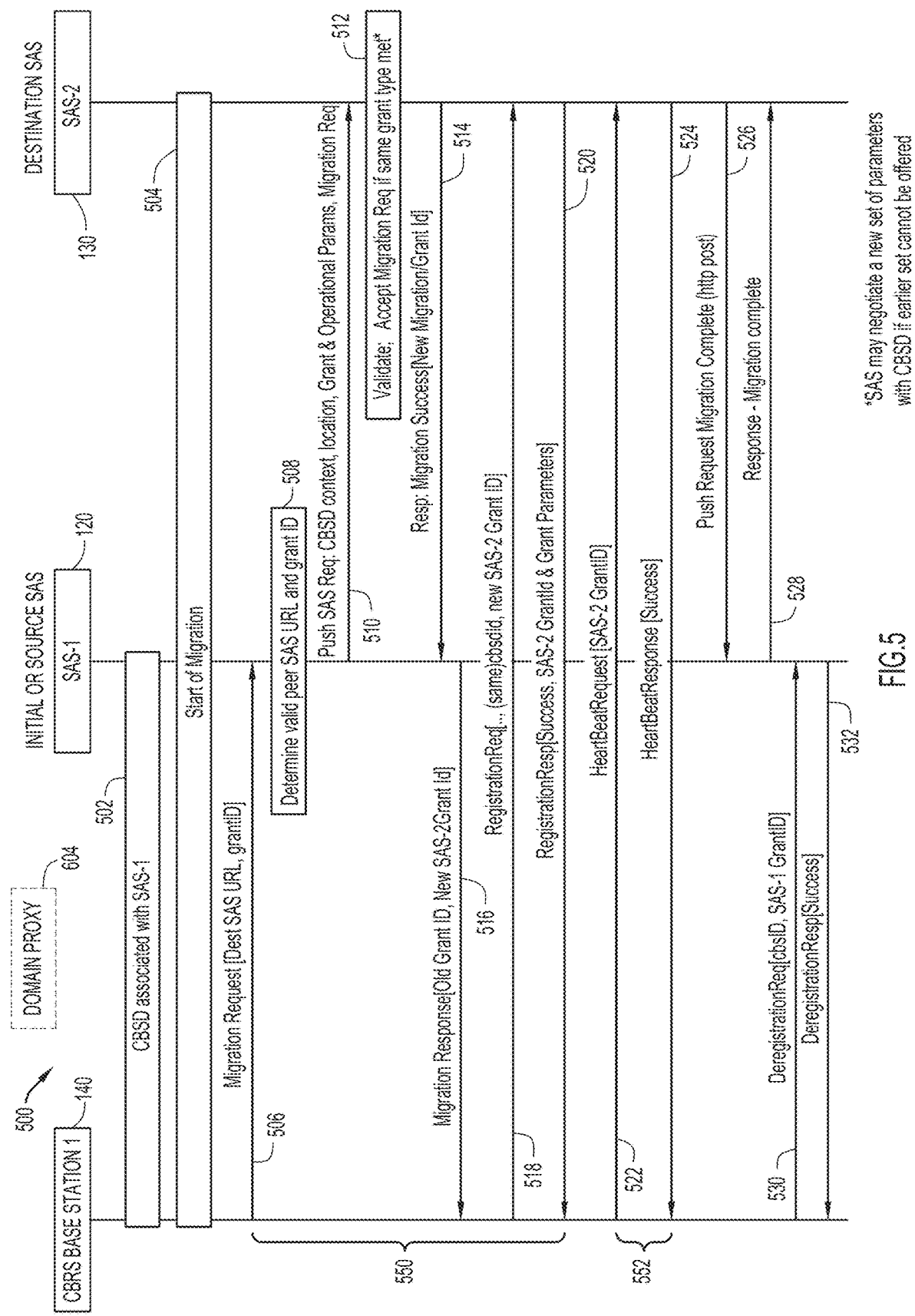
FIG. 5 is a call flow diagram for describing a more detailed method for migrating from a source SAS of a source SAS provider to a destination SAS of a destination SAS provider for a base station operative to serve as a CBSD in a CBRS network, according to a second detailed process of the present disclosure.

FIG. 5 is a call flow diagram 500 for describing a more detailed method for migrating from source SAS 120 of the source SAS provider to destination SAS 130 of the destination SAS provider for base station 140 operative to serve as a CBSD in the CBRS network, according to a second detailed process of the present disclosure. Although references to communication (e.g. sending and/or receiving messages) with base station 140 may be made, it is understood that these communications may be made with domain proxy 604 (or other proxy or agent) as an alternative (see e.g. FIG. 6). In some implementations, the domain proxy may perform the method for each one of a plurality of base stations of the CBRS network, during the same or similar timeframe.

In FIG. 5, the CBSD or base station 140 is initially associated with source SAS 120 (step 502 of FIG. 5). More particularly, base station 140 is registered with source SAS 120 for spectrum access and operates to facilitate communications for one or more UEs. While registered with source SAS 120, base station 140 may operate to communicate with source SAS 120 in a plurality of (regular or periodic) message exchanges for receiving grants for spectrum access and for receiving authorizations to use granted spectrum.

An indication or instruction to change SAS providers may be received, to start a migration procedure between source SAS 120 of the source SAS provider to destination SAS 130 ("SAS 2") of the destination SAS provider (step 504 of FIG. 5). The indication or instruction, including identification of destination SAS 130, may be provided via the OAM or other configuration of the enterprise. Again, the need to change SAS providers may be based on considerations such as pricing, performance, differentiated feature offerings, type of support, and/or other reasons.

In response, base station 140 may communicate in a plurality of message exchanges 550 for registering with destination SAS 130, and for receiving from destination SAS 130 a grant for spectrum access to spectrum according to a plurality of operating parameters. In addition, base station 140 may communicate in a message exchange 552 with destination SAS 130 in a heartbeat procedure for receiving an authorization to use the granted spectrum, as indicated in a message exchange 452 of FIG. 5. Note that these message exchanges 550 and 552 also correspond to message exchanges performed by the server of destination SAS 130 for registering base station 140 and granting spectrum access to spectrum. Message exchanges 550 and 552 will now be discussed.

With more detail, base station 140 may send to source SAS 120 a message indicating a migration request (step 506 of FIG. 5). The message indicating the migration request may be an enhancement to the existing SAS-CBSD protocol for triggering the migration procedure to another SAS provider. The migration request may include an identifier of destination SAS 130, the CBSD ID, the grant ID and the grant type assigned by source SAS 120. In some implementations, the identifier of destination SAS 130 is an address such as a Uniform Resource Locator (URL) used to reach destination SAS 130 for migration. Source SAS 120 may receive the message indicating the migration request. In response, source SAS 120 may validate the request; e.g. validate the URL (e.g. to identify whether it is associated with a valid, peer SAS) and the grant ID (step 508 of FIG. 5). Source SAS 120 may obtain CBSD context and/or other data and including the operational parameters associated with the grant ID.

If validation in step 508 is successful, source SAS 120 may send to destination SAS 130 a message indicating a corresponding migration request (step 510 of FIG. 5). In particular, source SAS 120 may provide a "Push" SAS request for migration (e.g. an HTTP POST), which may include the CBSD context and/or other data, the grant ID, the grant type, and the operating parameters. Source SAS 120 may receive the message indicating the corresponding migration request. In response, destination SAS 130 may perform a channel access assessment to validate the operating parameters, identifying whether it is able to accommodate the same set of operating parameters as this existing set of operating parameters (step 512 of FIG. 5).

In step 512, destination SAS 130 may grant spectrum access according to the operating parameters if the same grant type is met. If so, destination SAS 130 may send to source SAS 120 a message indicating a migration response which includes a new grant ID for the grant (step 514 of FIG. 5). Source SAS 120 may receive the message from destination SAS 130 and, in response, send to base station 140 a corresponding message indicating a migration response (step 516 of FIG. 5). This migration response may include the grant ID assigned by source SAS 120 and the new grant ID assigned by destination SAS 130. The new grant ID may be considered a migration ID associated with a successful confirmation to migrate or the migration.

In some implementations, these operating parameters may be the same operating parameters as those previously granted by source SAS 120. In some implementations, if destination SAS 130 is unable to assign or grant the same set of operating parameters in step 512, destination SAS 130 may provide a new set of parameters to base station 140 and wait for a response before confirming the grant. This wait time may be provided to base station 140 to allow base station 140 to identify or prepare a new set of operating parameters.

Base station 140 may then send to destination SAS 130 a message indicating registration request for a registration procedure to register with destination SAS 130 (step 518 of FIG. 5). The registration request may include one or more data items, including the CBSD ID assigned by source SAS 120 and the new grant ID assigned by destination SAS 130. Destination SAS 130 may receive the message indicating the registration request and, in response, register the base station 140 with destination SAS 130. Destination SAS 130 may then send to base station 140 a message indicating a registration response which includes the new grant ID assigned by destination SAS 130 and the plurality of operating parameters for the granted spectrum (step 520 of FIG. 5).

Base station 140 may then send to destination SAS 130 a message indicating a heartbeat request for a heartbeat procedure with destination SAS 130 (step 522 of FIG. 5). The heartbeat request may include the new grant ID of the grant of spectrum access obtained from destination SAS 130. Destination SAS 130 may receive the message indicating the heartbeat request. In response, destination SAS 130 may process the heartbeat request and send to base station 140 a message indicating a heartbeat response (step 524 of FIG. 5). Base station 140 may receive the message indicating the heartbeat response. This heartbeat response indicates that base station 140 is authorized to use the granted spectrum, and may further provide a trigger to base station 140 to deregister from source SAS 120.

In response to receiving the heartbeat request, destination SAS 130 may send to source SAS a message indicating a completion of the migration (step 526 of FIG. 5). In particular, destination SAS 130 may provide a "Push" Request Migration Complete request (e.g. an HTTP POST), to indicate that the migration procedure has been completed or is successful. Destination SAS 130 may receive the message indicating the completion of migration. In response, destination SAS 130 may send to source SAS 120 a message indicating an acknowledgement or response to the completion to the migration (step 528 of FIG. 5).

In response to the previously-received heartbeat request in step 522, base station 140 may send to source SAS 120 a message indicating a deregistration request for a deregistration procedure (step 530 of FIG. 5). The deregistration request may include the CBSD ID and the grant ID assigned by source SAS 120. Source SAS 120 may receive the message indicating the deregistration request and, in response, source SAS 120 may deregister base station 140 and send to base station 140 a message indicating a deregistration response (step 532 of FIG. 5). Base station 140 is now registered with destination SAS 130 of the destination SAS provider and deregistered from source SAS 120 of the source SAS provider.

In some scenarios, all CBSDs or base stations of a CBRS network may be migrated from a source SAS of a source SAS provider to a destination SAS of a destination SAS provider, as described in relation to FIG. 5 (whether performed individually or in a group via a domain proxy). In other scenarios, only some of the CBSDs or base stations of the CBRS network may be migrated from the source SAS to the destination SAS, thereby leaving some of the CBSDs or base stations registered with the source SAS while some of the CBSDs or base stations are registered with the destination SAS.

In some implementations, the latter scenario may be permitted when a grouping of base stations for a CBRS network is attempted for migration (e.g. by the domain proxy) but the destination SAS is unable to assign or grant the same set of operating parameters for all of the base stations but only rather some of the base stations. Here, a wait timer may be set and run, at each base station or the domain proxy, in order to allow each base station or the domain proxy to re-request or re-invoke migration to the destination SAS. In some implementations, the wait timer may be exchanged or sent from the destination SAS to the base station or domain proxy.

Advantageously, at least in some implementations, the techniques and mechanisms for migration according to the present disclosure may prevent disruption of services to connected clients or UEs, providing a seamless, zero downtime migration between SAS providers for CBRS networks.

Figure 7:
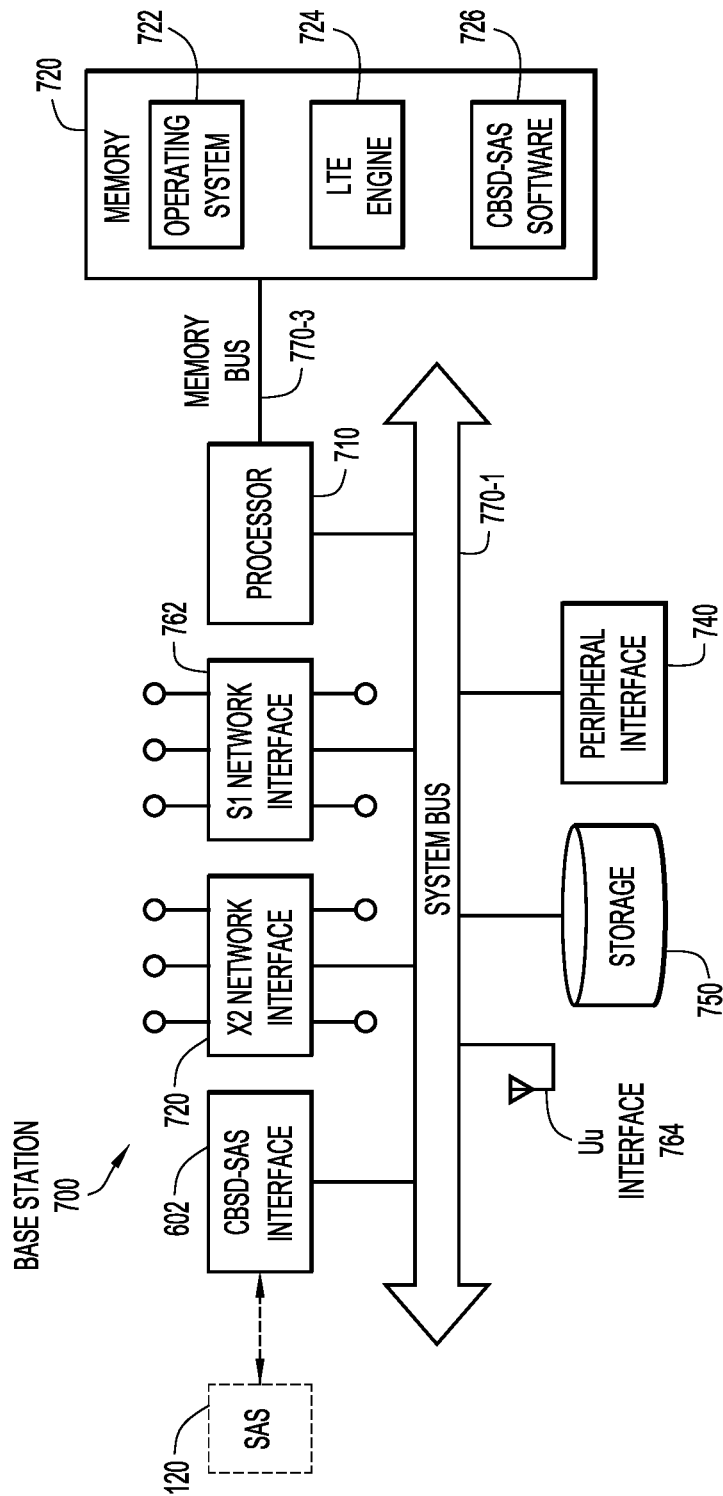
FIG. 7 is a schematic block diagram of a CBRS base station or CBSD which may be used in at least some implementations.

FIG. 7 is a block diagram of a base station 700 according to one or more examples of the present disclosure. Base station 700 of FIG. 7 may operative to serve as a CBSD according to at least some implementations, and may be or be referred to as an AP (used interchangeably herein). In various implementations, a base station may be or comprise any suitable computing device or device configuration configured to perform services of such a base station, such as an eNodeB (eNB), an example of which is illustrated in FIG. 7.

Base station 700 may include a processor 710 connected to a memory 720, having stored therein executable instructions for providing an operating system 722. In some implementations, processor 710 may include any combination of hardware, software, or firmware providing programmable logic, including by way of non-limiting example a microprocessor, digital signal processor, field-programmable gate array, programmable logic array, application-specific integrated circuit, or virtual machine processor. Operating system 722 may provide low-level hardware access methods, scheduling, and other services. Memory 720 may also have stored therein executable instructions for providing an LTE engine 724 and a CBSD-SAS (software) module 726.

In this example, processor 710 may be communicatively coupled to memory 720 via a memory bus 770-3, which may be for example a direct memory access (DMA) bus. Although memory 720 is illustrated in FIG. 7 as a single logical block, in actual practice memory 720 may include one or more blocks of any suitable volatile or non-volatile memory technology or technologies. This may include, for example, Synchronous Dynamic Random Access Memory (SDRAM), Double Data Rate (DDR), Random Access Memory (RAM), Static RAM (SRAM), Dynamic RAM (DRAM), cache, L1 or L2 memory, on-chip memory, registers, flash, Read-Only Memory (ROM), optical media, virtual memory regions, magnetic or tape memory, or similar.

Processor 710 may also be communicatively coupled to a storage 750 via a system bus 770-1. A bus, such as system bus 770-1, may include any wired or wireless interconnection line, network, connection, bundle, single bus, multiple buses, crossbar network, single-stage network, multistage network or other conduction medium operable to carry data, signals, or power between parts of a base station, or between base stations. Storage 750 may be any species of memory 720, or may be a separate device, such as a hard drive, solid-state drive, external storage, Redundant Array of Independent Disks (RAID), network-attached storage, optical storage, tape drive, backup system, cloud storage, or any combination of the foregoing. Storage 750 may be, or may include therein, a database or databases or data stored in other configurations, and may include a stored copy of operational software such as an operating system and a copy of operating system 722, LTE engine 724, and/or CBSD-SAS software 726.

In some implementations, memory 720 may comprise a relatively low-latency volatile main memory, while storage 750 may comprise a relatively higher-latency non-volatile memory. However, memory 720 and storage 750 need not be physically separate devices, and in some examples may represent simply a logical separation of function.

In some implementations, LTE engine 724 may be a utility or program that carries out LTE-related tasks. In some implementations, LTE engine 724 may include executable instructions stored on a non-transitory medium operable to perform relevant methods. At an appropriate time, such as upon booting base station 700 or upon a command from the operating system or a user, processor 710 may retrieve a copy of LTE engine 724 from storage 750 and load it into memory 720. Processor 710 may then iteratively execute the instructions of LTE engine 724.

Other components of base station 700 include an X2 network interface 760, a S1 network interface 762, a Uu Interface 764, and CBSD-SAS interface 602. X2 network interface 760 may be any suitable network interface providing connectivity to the X2 network layer, and in one example is a high-reliability physical network connection. S1 network interface 762 may be any suitable network interface providing connectivity to the S1 network layer, and in one example is a high-reliability physical network connection. Uu network interface 764 may be any suitable network interface providing connectivity to UE 120, and in this example is a wireless network interface.

CBSD-SAS interface 602 may provide connectivity and/or communications with one or more SASs (e.g. SAS 120) in accordance with functionality provided by CBSD-SAS software 726. CBSD-SAS software 726 may operate according to existing CBRS standards, with modification, adaptation, and/or additions provided according to at least some implementations of the present disclosure. In some implementations, CBSD-SAS module 726 may include executable instructions stored on a non-transitory medium operable to perform one, more or all of the relevant portions of the methods. At an appropriate time, such as upon booting base station 700 or upon a command from the operating system or the user, processor 710 may retrieve a copy of CBSD-SAS module 726 from storage 750 and load it into memory 720. Processor 710 may then execute the instructions of CBSD-SAS module 726 as needed.

A peripheral interface 740 may be provided to connect to peripherals, including any auxiliary device that connects to base station 700, but that is not necessarily a part of the core architecture of base station 700. A peripheral may be operable to provide extended functionality to base station 700, and may or may not be wholly dependent on base station 700. In suitable cases, a peripheral may be a separate computing device or another base station. Peripherals may include input and output devices such as displays, terminals, printers, keyboards, mice, modems, network controllers, sensors, transducers, actuators, controllers, data acquisition buses, cameras, microphones, speakers, or external storage by way of non-limiting example.

In some implementations, each of the elements of the system may couple to one another through simple interfaces or through any other suitable connection (wired or wireless), which provides a viable pathway for network communications. As referred to herein, a physical (wired or wireless) interconnection or interface can refer to an interconnection of one element or node with one or more other element(s), while a logical interconnection or interface can refer to communications, interactions and/or operations of elements with each other, which can be directly or indirectly interconnected, in a network environment.

Figure 8:
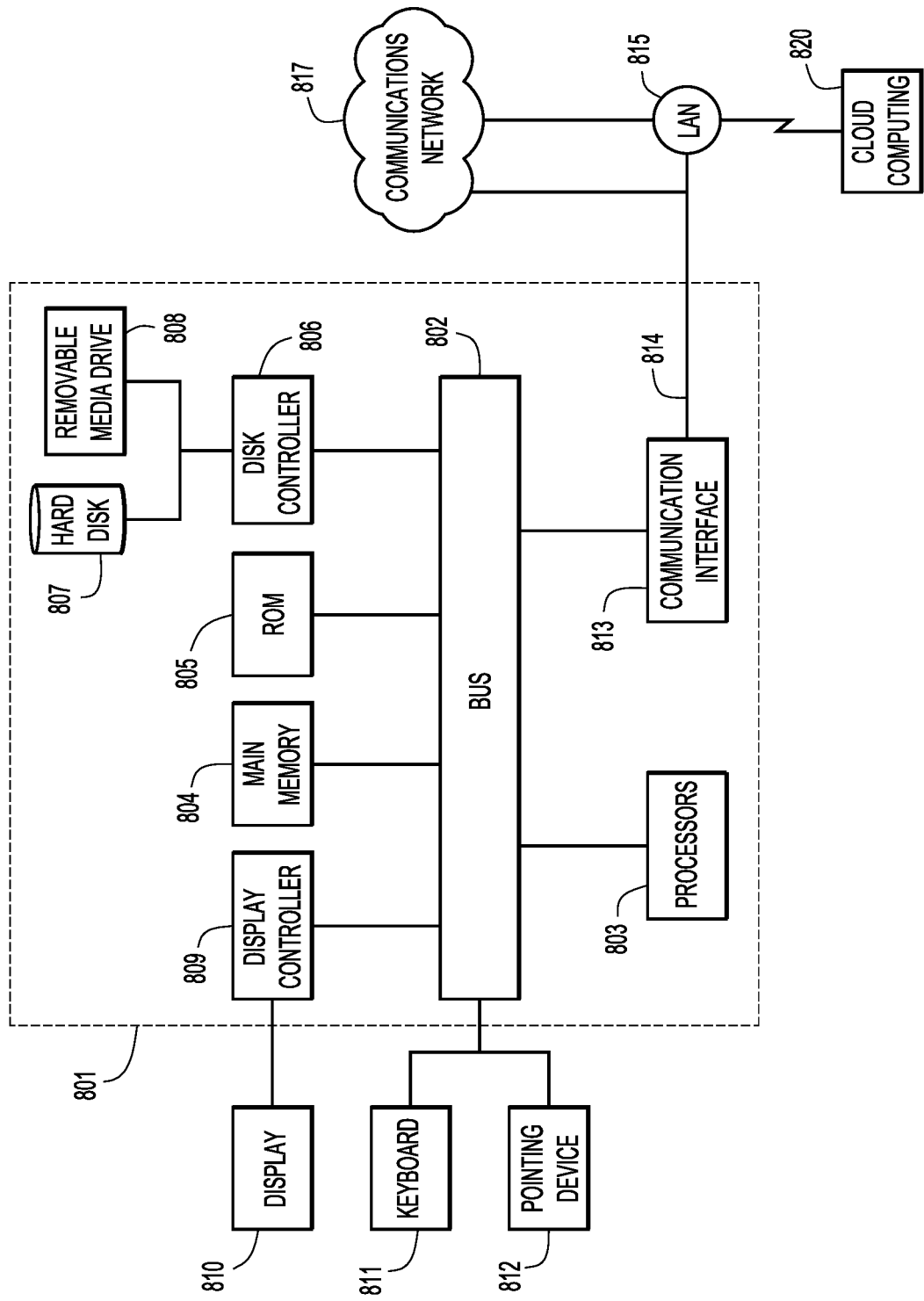
FIG. 8 is a schematic block diagram of a network node, such as a server (e.g. a server of a SAS) which may be used in at least some implementations.

FIG. 8 is a block diagram of a network node, such as a server, according to some implementations of the present disclosure. Such a network node or server may be provided for use in a SAS (e.g. destination SAS) according to some implementations. Alternatively, such a network node or server may be provided for use as or with a domain proxy according to some implementations.

In FIG. 8, the network node or server may comprise a computer system 801 which may include one or more processors 803 coupled to a bus 802 or other information communication mechanism. One or more processors 803 may be configured to process information which may be communicated over bus 802. While FIG. 8 shows a single block for one or more processors 803, they may in actual practice represent a plurality of processing cores, each of which may perform separate processing.

Computer system 801 may also include a main memory 804, such as a RAM or other dynamic storage device (e.g. DRAM, SRAM, SDRAM, etc.), coupled to bus 802 for storing information and instructions to be executed by one or more processors 803. Main memory 804 may be used for storing temporary variables or other intermediate information during the execution of instructions by one or more processors 803. Computer system 801 may further include a Read-Only Memory (ROM) 805 or other static storage device (e.g. a Programmable ROM or "PROM"), an Erasable PROM or "EPROM"), or an Electrically Erasable PROM or "EEPROM") coupled to bus 802 for storing static information and instructions for one or more processors 803.

Computer system 801 may also include a disk controller 806 coupled to bus 802 to control one or more storage devices for storing information and instructions, such as a magnetic hard disk 807, and a removable media drive 808 (e.g. floppy disk drive, read-only compact disc drive, read/write compact disc drive, compact disc jukebox, tape drive, and removable magneto-optical drive). The storage devices may be added to the computer system 801 using an appropriate device interface (e.g. small computer system interface or "SCSI," integrated device electronics or "IDE," enhanced-IDE "E-IDE," DMA, or ultra-DMA).

Computer system 801 may also include special purpose logic devices (e.g. application specific integrated circuits or "ASICs") or configurable logic devices (e.g. simple programmable logic devices or "SPLDs," complex programmable logic devices or "CPLDs," and field programmable gate arrays or "FPGAs") that, in addition to microprocessors and digital signal processors may individually, or collectively, are types of processing circuitry. The processing circuitry may be located in one device or distributed across multiple devices.

Computer system 801 may also include a display controller 809 coupled to bus 802 to control a display 810, such as a cathode ray tube (CRT), for displaying information to a computer user. Computer system 801 includes input devices, such as a keyboard 811 and a pointing device 812, for interacting with a computer user and providing information to one or more processors 803. Pointing device 812, for example, may be a mouse, a trackball, or a pointing stick for communicating direction information and command selections to one or more processors 803 and for controlling cursor movement on display 810.

Computer system 801 performs a portion or all of the processing steps of the process in response to one or more processors 803 executing one or more sequences of one or more instructions contained in a memory, such as main memory 804. Such instructions may be read into main memory 804 from another computer readable medium, such as a hard disk 807 or a removable media drive 808. One or more processors in a multi-processing arrangement may also be employed to execute the sequences of instructions contained in main memory 804. In alternative implementations, hard-wired circuitry may be used in place of or in combination with software instructions. Thus, the implementations are not limited to any specific combination of hardware circuitry and software.

As stated above, computer system 801 includes at least one computer readable medium or memory for holding instructions programmed according to some implementations, for containing data structures, tables, records, or other data described herein. Examples of computer readable media are compact discs, hard disks, floppy disks, tape, magneto-optical disks, PROMs (e.g. EPROM, EEPROM, flash EPROM), DRAM, SRAM, SDRAM, or any other magnetic medium, compact discs (e.g. CD-ROM), or any other optical medium, punch cards, paper tape, or other physical medium with patterns of holes, or any other medium from which a computer can read.

Stored on any one or on a combination of non-transitory computer readable storage media, some implementations presented herein include software for controlling computer system 801, for driving a device or devices for implementing the process, and for enabling computer system 801 to interact with a human user (e.g. print production personnel). Such software may include, but is not limited to, device drivers, operating systems, development tools, and applications software. Such computer readable storage media may further include a computer program product for performing all or a portion (if processing is distributed) of the processing presented herein. The computer code devices may be any interpretable or executable code mechanism, including but not limited to scripts, interpretable programs, Dynamic Link Libraries (DLLs), Java classes, and complete executable programs. Moreover, parts of the processing may be distributed for better performance, reliability, and/or cost.

Computer system 801 also includes a communication interface 813 coupled to bus 802. Communication interface 813 provides a two-way data communication coupling to a network link 814 that is connected to, for example, a Local Area Network (LAN) 815, or to a communications network 817 such as the Internet. For example, communication interface 813 may be a wired or wireless network interface card to attach to any packet switched (wired or wireless) LAN. As another example, communication interface 813 may be an asymmetrical Digital Subscriber Line (ADSL) card, an Integrated Services Digital Network (ISDN) card or a modem to provide a data communication connection to a corresponding type of communications line. Wireless links may also be implemented. In any such implementation, communication interface 813 sends and receives electrical, electromagnetic or optical signals that carry digital data streams representing various types of information.

Network link 814 typically provides data communication through one or more networks to other data devices. For example, network link 814 may provide a connection to another computer through LAN 815 or through equipment operated by a service provider, which provides communication services through a communications network 812. Local network 814 and communications network 812 use, for example, electrical, electromagnetic, or optical signals that carry digital data streams, and the associated physical layer (e.g. CAT 5 cable, coaxial cable, optical fiber, etc.). The signals through the various networks and the signals on network link 814 and through communication interface 813, which carry the digital data to and from computer system 801 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. Computer system 801 can transmit and receive data, including program code, through the networks (e.g. LAN 815 and communication network 817), network link 814 and communication interface 813. Moreover, network link 814 may provide a connection through LAN 815 to a cloud computing network 820 if and as needed.

The terms 'data', 'information', 'parameters' and variations thereof as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In some implementations, a system or network may represent a series of points or nodes of interconnected communication paths (wired or wireless) for receiving and transmitting packets of information that propagate through the network. In some implementations, a network can be associated with and/or provided by a single network operator or service provider and/or multiple network operators or service providers. In various implementations, the network may include and/or overlap with, in whole or in part, one or more packet data network(s) (e.g. one or more packet data networks). A network may offer communicative interfaces between various elements and may be further associated with any LAN, Wireless Local area network (WLAN), Metropolitan Area Network (MAN), Wide Area Network (WAN), Virtual Private Network (VPN), Radio Access Network (RAN), Virtual Local Area Network (VLAN), enterprise network, Intranet, extranet, Low Power Wide Area Network (LPWAN), Low Power Network (LPN), Machine-to-Machine (M2M) network, IoT network, or any other appropriate architecture or system that facilitates communications in a network environment.

In various embodiments, a UE may be associated with any electronic device seeking to initiate a flow in the system via some network. The terms 'UE', 'mobile device,' 'mobile radio device,' 'end device', 'user', 'subscriber' or variations thereof can be used herein interchangeably and are inclusive of devices used to initiate a communication, such as a computer, an electronic device such as an IoT device (e.g. an appliance, a thermostat, a sensor, a parking meter, etc.), a Personal Digital Assistant (PDA), a laptop or electronic notebook, a cellular telephone, an IP phone, an electronic device having cellular and/or Wi-Fi connection capabilities, a wearable electronic device, or any other device, component, element, or object capable of initiating voice, audio, video, media, or data exchanges within the system. A UE may also be inclusive of a suitable interface to a human user such as a microphone, a display, a keyboard, or other terminal equipment.

Note that in some implementations, operations as outlined herein to facilitate techniques of the present disclosure may be implemented by logic encoded in one or more tangible media, which may be inclusive of non-transitory tangible media and/or non-transitory computer readable storage media (e.g. embedded logic provided in an ASIC, in Digital Signal Processing (DSP) instructions, software—potentially inclusive of object code and source code—to be executed by a processor, or other similar machine, etc.). In some of these instances, a memory element and/or storage may store data, software, code, instructions (e.g. processor instructions), logic, parameters, combinations thereof or the like used for operations described herein. This includes memory elements and/or storage being able to store data, software, code, instructions (e.g. processor instructions), logic, parameters, combinations thereof, or the like that are executed to carry out operations described herein.

A processor (e.g. a hardware processor) may execute any type of instructions associated with data to achieve the operations detailed herein. In one example, a processor may transform an element or an article (e.g. data, information) from one state or thing to another state or thing. In another example, operations outlined herein may be implemented with logic, which can include fixed logic, hardware logic, programmable logic, digital logic, etc. (e.g. software/computer instructions executed by a processor), and/or one or more the elements identified herein could be some type of a programmable processor, programmable digital logic (e.g. a FPGA), a DSP processor, an EPROM, a controller, an EEPROM, or an ASIC) that includes digital logic, software, code, electronic instructions, or any suitable combination thereof.

It is noted that the operations and steps described with reference to the figures illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, the system may be applicable to other exchanges or routing protocols, interfaces, and/or communications standards, proprietary, and/or non-proprietary. Moreover, although the system has been illustrated with reference to particular elements and operations that facilitate the communication process, these elements, and operations may be replaced by any suitable architecture or process that achieves the intended functionality of the system.

Although some implementations of the present disclosure relate to CBRS networks which utilize 4G/LTE/EPC technology, other implementations may include or involve a Control and User Plane Separation (CUPS) or Fifth Generation (5G) network technology or architecture, as just a few examples. Here, the 5G network may be a private 5G network with a 5G mobile core.

Further, it is noted that the CBRS/SAS implementations described herein apply to the industry and market in the U.S. However, the inventive techniques and mechanisms additionally and alternatively apply to industries and markets outside of the U.S. and/or to other shared spectrums or bands. To better illustrate, countries in Europe are considering local licensing approaches using shared spectrum and cellular-oriented frequencies. For example, local licensing in Europe are considering the 3.4 GHz-3.8 GHz range of frequencies. Some activity in Sweden and Germany relates specifically to the 3.7 GHz-3.8 GHz range. In the UK, some innovative approaches for local licensing in the 3.8 GHz-4.2 GHz range are being considered. Other regulatory activity may relate to unlicensed operation in the 6 GHz band (5925-7125 MHz), for example, since access to wider channels (80, 160, and even 320 MHz wide) may be necessary as Wi-Fi moves into multi-Gigabits per second (Gbps) physical layer (PHY) rates. Accordingly, the (claimed) terms CBRS, CBSD, and/or SAS may include, define, or be broadened to define such "services," "bands," "devices," and/or "systems."

Although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

It will also be understood that, although the terms "first," "second," etc. may be used herein to describe various elements, these elements should not be limited by these terms. These terms are used to distinguish one element from another. For example, a first SAS provider could be termed a second SAS provider, and similarly, a second SAS provider could be termed a first SAS provider, without changing the meaning of the description, so long as all occurrences of the "first SAS provider" are renamed consistently and all occurrences of the "second SAS provider" are renamed consistently. The first SAS provider and the second SAS provider are both radio providers, but they are not the same SAS provider.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at or on behalf of a base station operative to serve as a Citizens Broadband Radio Service Device (CBSD) in a Citizens Broadband Radio Service (CBRS) network, participating in a migration procedure from a source Spectrum Access System (SAS) of a source SAS provider to a destination SAS of a destination SAS provider by:
while the base station operates to facilitate communications for one or more user equipments (UEs) and is registered with the source SAS for spectrum access, communicating in one or more message exchanges for registering with the destination SAS and for receiving from the destination SAS a grant for spectrum access to spectrum according to a plurality of operating parameters; and
communicating in a message exchange with the destination SAS in a heartbeat procedure for receiving an authorization to use the granted spectrum.

2. The method of claim 1, wherein the method is performed by the base station operative to serve as the CBSD, or by a domain proxy which communicates with the base station operative to serve as the CBSD.

3. The method of claim 1, further comprising:
after receiving authorization to use the granted spectrum, communicating in a message exchange for a deregistration procedure for deregistering the base station with the source SAS.

4. The method of claim 1, wherein communicating in the one or more message exchanges comprises sending a message indicating a registration request for a registration procedure with the destination SAS, the registration request including a CBSD ID assigned to the base station by the source SAS which is provided to the destination SAS for obtaining CBSD data associated with the base station.

5. The method of claim 4, wherein sending the message indicating the registration request further comprises sending the message indicating the registration request to the destination SAS via the source SAS.

6. The method of claim 4, wherein communicating in the one or more message exchanges comprises sending to the destination SAS a message indicating a grant request for a grant procedure for receiving the grant for spectrum access, the grant request including a grant ID assigned to the base station by the source SAS and provided to the destination SAS for obtaining or validating the plurality of operating parameters in the grant procedure.

7. The method of claim 1, wherein communicating in the one or more message exchanges comprises sending to the source SAS a message indicating a migration request for the migration procedure, the migration request including an identifier of the destination SAS and a grant ID assigned to the base station by the source SAS, the migration request being for use by the source SAS for sending a message indicating a corresponding migration request for the migration procedure to the destination SAS.

8. The method of claim 7, wherein communicating in the one or more message exchanges further comprises sending a message indicating a registration request for a registration procedure with the destination SAS, the registration request including a grant ID received from the destination SAS in a message indicating a migration response for the migration procedure.

9. The method of claim 1, wherein during the migration procedure:
the base station is authorized by the source SAS to use the spectrum; or
the base station operates to facilitate the communications for the one or more UEs with little or no interruption to the communications; or
the base station receives from the destination SAS a grant for the plurality of operating parameters which are the same as those received from the source SAS.

10. The method of claim 1, which is performed with use of a computer program product comprising a non-transitory computer readable medium and computer instructions stored in the non-transitory computer readable medium, the computer instructions being executable by one or more processors of the base station or domain proxy thereof.

11. A method comprising:
at one or more servers of a destination Spectrum Access System (SAS), participating a migration procedure from a source SAS of a source SAS provider to the destination SAS of a destination SAS provider for a base station operative to serve as a Citizens Broadband Radio Service Device (CBSD) in a Citizens Broadband Radio Service (CBRS) network by:
while the base station operates to facilitate communications for one or more user equipments (UEs) and is registered with the source SAS for spectrum access, communicating in one or more message exchanges for registering the base station with the destination SAS and for granting spectrum access to spectrum according to a plurality of operating parameters; and
communicating in a message exchange with the base station or domain proxy thereof in a heartbeat procedure to provide authorization to use the granted spectrum.

12. The method of claim 11, wherein communicating in the one or more message exchanges for registering the base station comprises receiving from the base station or domain proxy thereof a message indicating a registration request for a registration procedure, the registration request including a CBSD ID assigned to the base station by the source SAS, the method further comprising:
obtaining CBSD data associated with the base station based on the CBSD ID.

13. The method of claim 12, wherein communicating in the one or more message exchanges for granting the spectrum access further comprises receiving from the base station or domain proxy thereof a message indicating a grant request for a grant procedure for granting the spectrum access, the grant request including a grant ID assigned by the source SAS to the base station, the method further comprising:
obtaining the plurality of operating parameters based on the grant ID;
performing a channel access assessment based on the plurality of operating parameters for validating the plurality of operating parameters; and
based on an outcome of the channel access assessment, sending to the base station or domain proxy thereof a message indicating a grant response for the grant procedure, for granting the spectrum access to the spectrum according to the plurality of operating parameters, the grant response including a new grant ID.

14. The method of claim 11, wherein communicating in the one or more message exchanges comprises receiving from the source SAS a message indicating a migration request for the migration procedure, the migration request including a grant ID assigned by the source SAS and a plurality of operating parameters, the method further comprising:
performing a channel access assessment based on the plurality of operating parameters for validating the plurality of operating parameters; and
based on an outcome of the channel access assessment, sending to the source SAS a message indicating a migration response for the migration procedure, the migration response indicating a new grant ID.

15. The method of claim 14, wherein communicating in the one or more message exchanges comprises receiving from the base station or domain proxy thereof a message indicating a registration request for a registration procedure, the registration request including the new grant ID assigned to the base station by the source SAS.

16. The method of claim 11, wherein communicating in the message exchange with the base station or domain proxy thereof in the heartbeat procedure is performed before base station deregistration with the source SAS.

17. The method of claim 11, wherein:
the migration procedure is performed while the base station is authorized by the source SAS to use granted spectrum; or
the migration procedure is performed to provide little or no interruption to operation of the base station to facilitate communications for the one or more UEs.

18. A server configured to participate in a migration procedure from a source Spectrum Access System (SAS) of a source SAS provider to a destination SAS of a destination SAS provider for a base station operative to serve as a Citizens Broadband Radio Service Device (CBSD) in a Citizens Broadband Radio Service (CBRS) network, the server being for use in the destination SAS and comprising:
a network interface;
one or more processors configured to:
while the base station operates to facilitate communications for one or more user equipments (UEs) and is registered with the source SAS for spectrum access, communicating in one or more message exchanges via the network interface for registering the base station with the destination SAS and for granting spectrum access to spectrum according to a plurality of operating parameters; and
communicating in a message exchange via the network interface with the base station or domain proxy thereof in a heartbeat procedure to provide authorization to use the granted spectrum.

19. The server of claim 18, wherein the one or more processors are further configured to communicate in the one or more message exchanges for registering the base station and for granting the spectrum access by:
receiving, from the base station or domain proxy thereof, a message indicating a registration request for a registration procedure, the registration request including a CBSD ID assigned to the base station by the source SAS;
obtaining CBSD data associated with the base station based on the CBSD ID;
receiving, from the base station or domain proxy thereof, a message indicating a grant request for a grant procedure for granting the spectrum access, the grant request including a grant ID assigned by the source SAS to the base station;
obtaining the plurality of operating parameters based on the grant ID;
performing a channel access assessment based on the plurality of operating parameters for validating the plurality of operating parameters; and
based on an outcome of the channel access assessment, sending to the base station or domain proxy thereof a message indicating a grant response for the grant procedure, for granting the spectrum access to the spectrum according to the plurality of operating parameters, the grant response including a new grant ID.

20. The server of claim 18, wherein the one or more processors are further configured to communicate in the one or more message exchanges for registering the base station and for granting the spectrum access by:
receiving from the source SAS a message indicating a migration request for the migration procedure, the migration request including a grant ID assigned by the source SAS and a plurality of operating parameters;
performing a channel access assessment based on the plurality of operating parameters for validating the plurality of operating parameters;
based on an outcome of the channel access assessment, sending to the source SAS a message indicating a migration response for the migration procedure, the migration response indicating a new grant ID; and
receiving, from the base station or domain proxy thereof, a message indicating a registration request for a registration procedure, the registration request including a CBSD ID assigned to the base station by the source SAS and the new grant ID.

* * * * *